No. 815,603. PATENTED MAR. 20, 1906.
A. C. LINDGREN.
CORN PLANTER.
APPLICATION FILED JAN. 9, 1906.
4 SHEETS—SHEET 2.
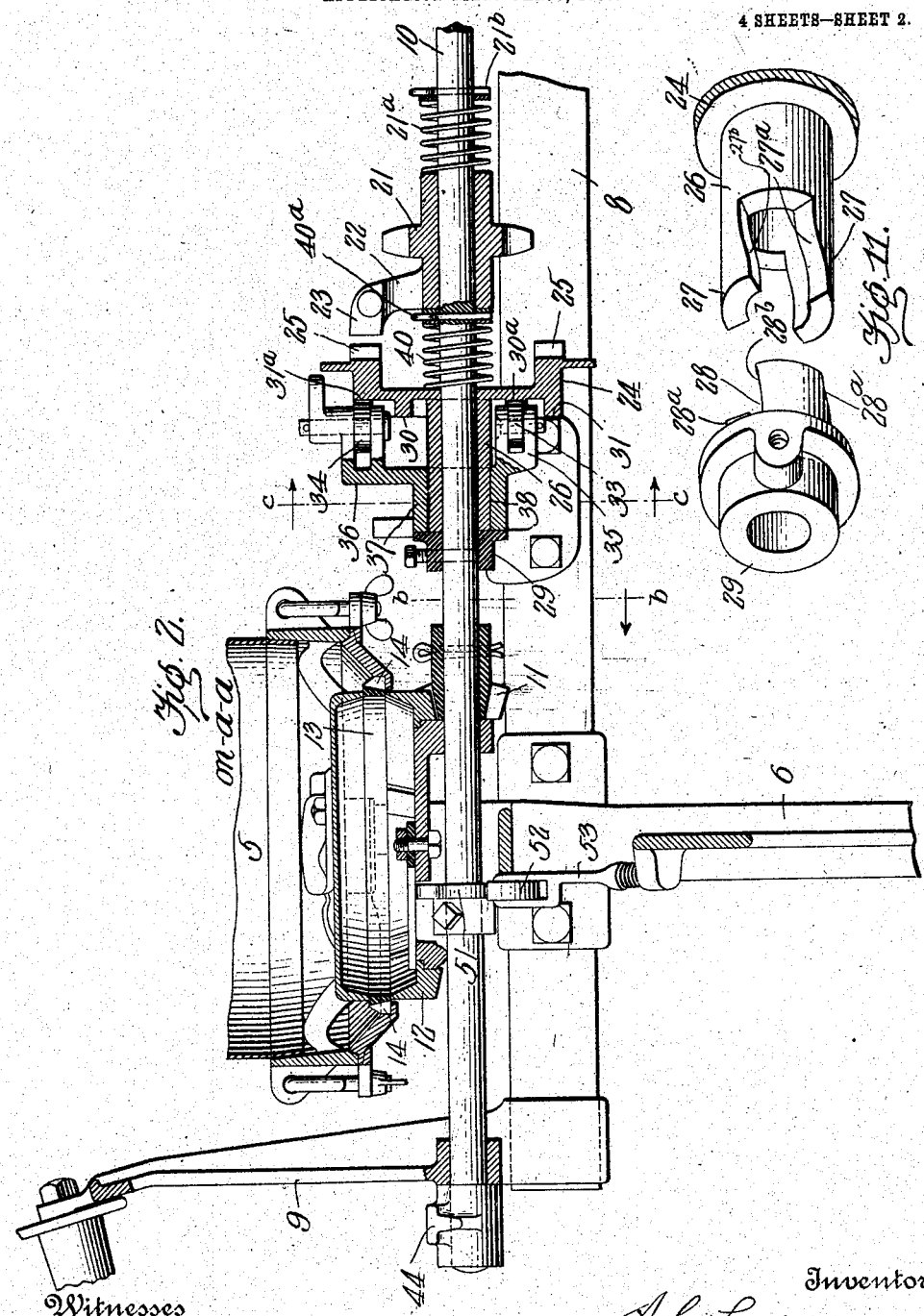
Witnesses
Jos. F. Collins.
Luther Morrison
Inventor
A. C. Lindgren
By Phil. T. Dodge
Attorney

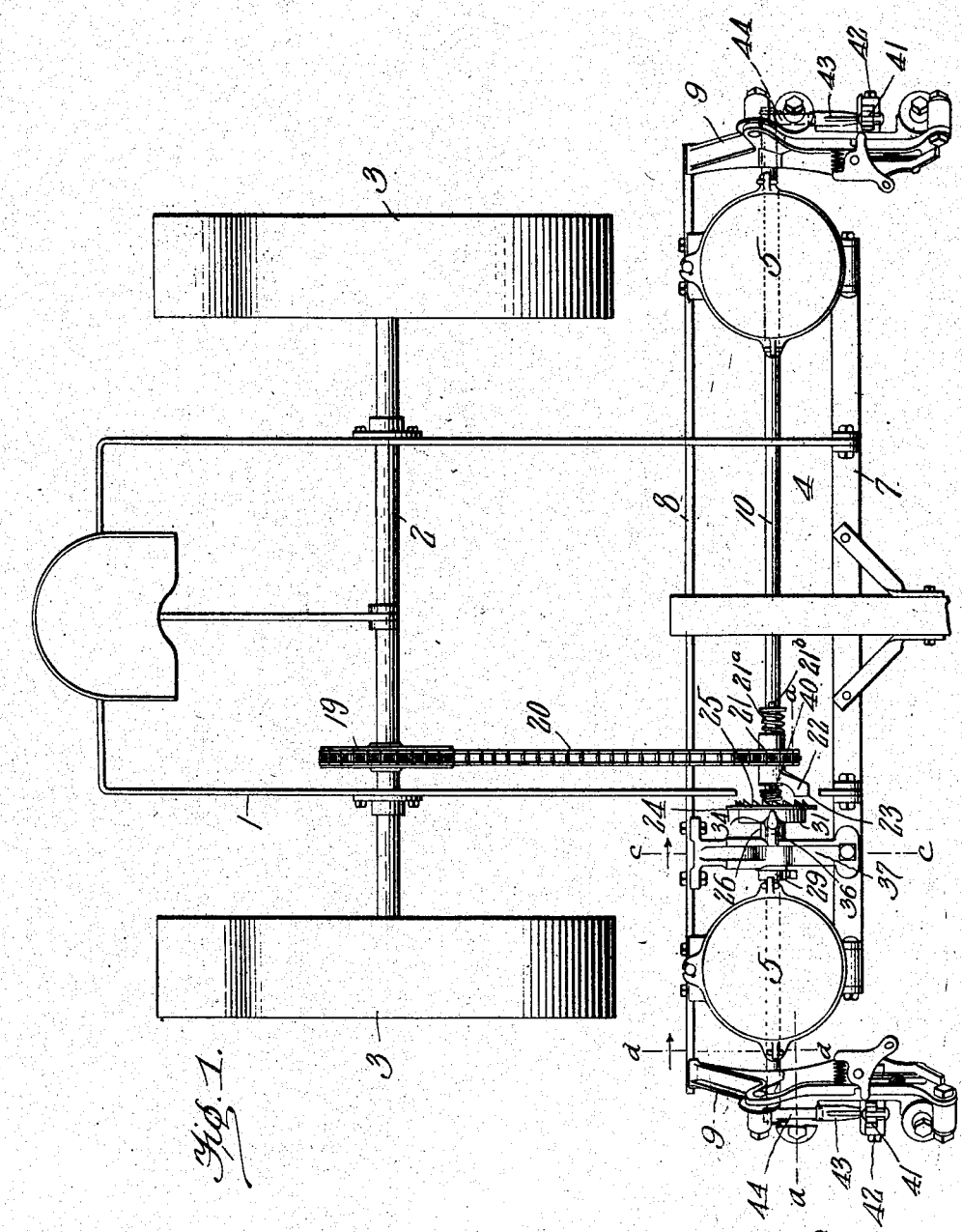

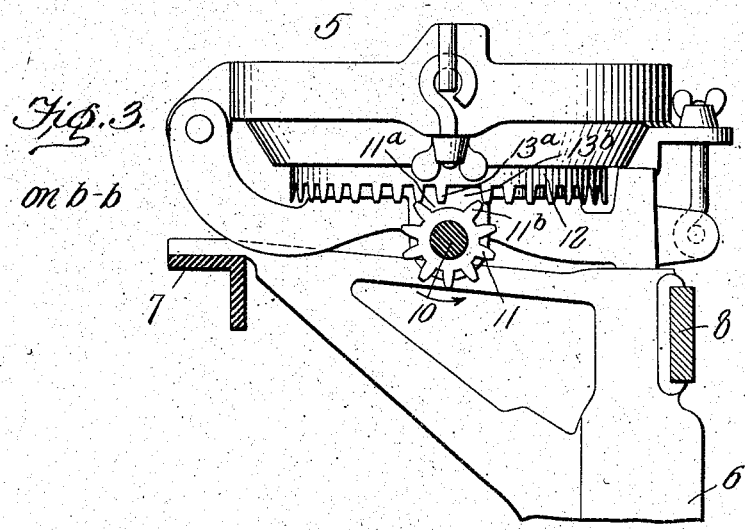
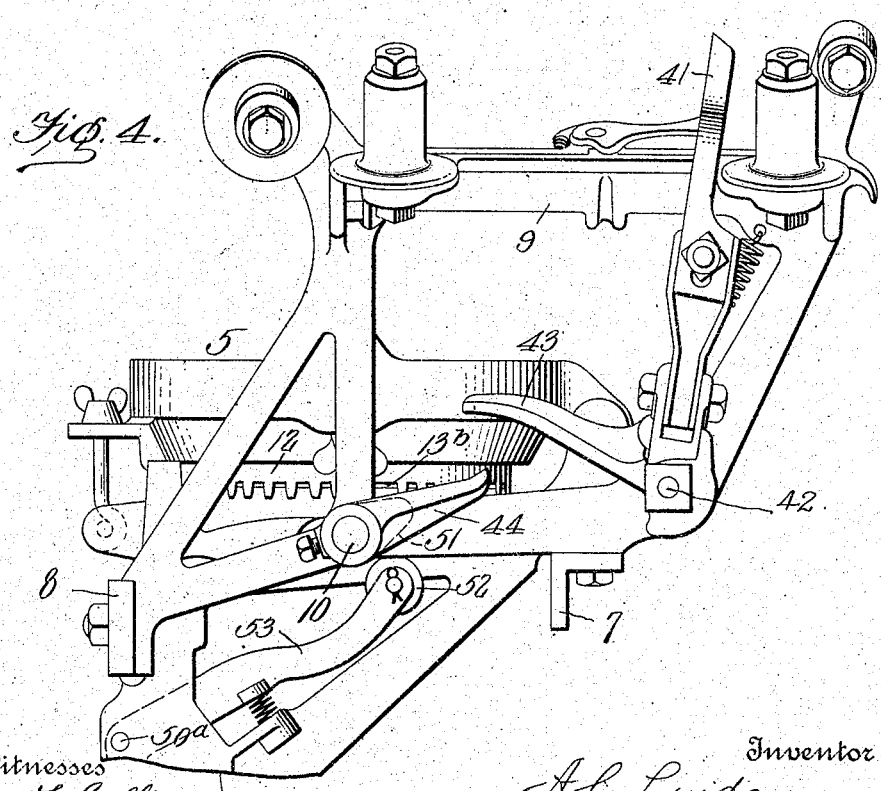

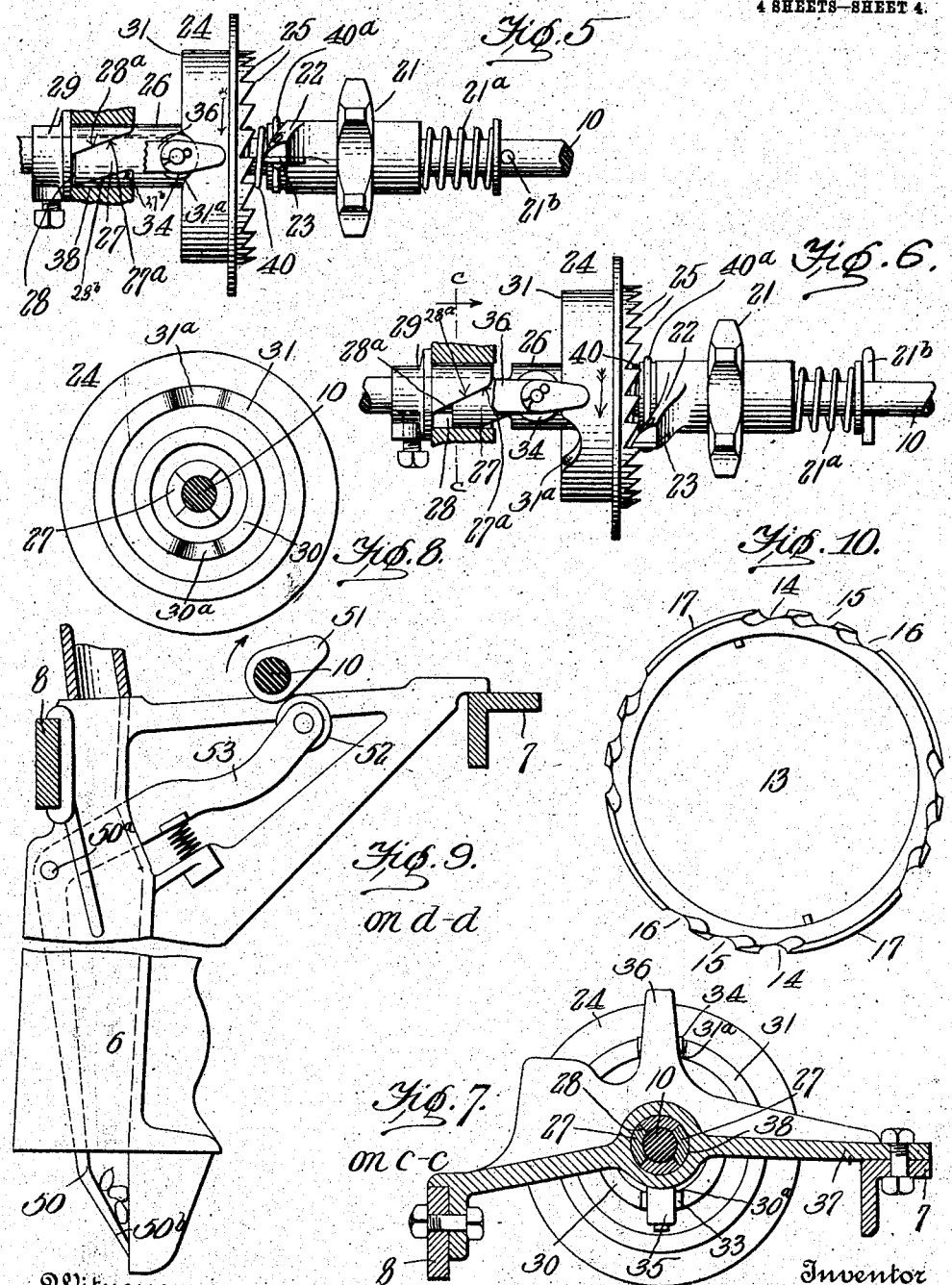

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

CORN-PLANTER.

No. 815,603.　　　　Specification of Letters Patent.　　Patented March 20, 1906.

Application filed January 9, 1906. Serial No. 295,278.

*To all whom it may concern:*

Be it known that I, ALEXUS C. LINDGREN, of Moline, county of Rock Island and State of Illinois, have invented a new and useful Improvement in Corn-Planters, of which the following is a specification.

This invention has reference more particularly to corn-planting machines of the type in which the seed-delivering mechanism is operated from the ground or covering wheels periodically through the medium of a clutch mechanism which is thrown into action by the check-row mechanism and which after causing the seed-delivering mechanism to be operated for a predetermined time is automatically thrown out of action. In machines of this character the clutch mechanism is usually interposed in the driving connection between the ground-wheels and the seed or operating shaft, which latter is geared to the seed-delivering mechanism, and by suitable connections the throw of the check-fork when it encounters a knot on the check-wire actuates the clutch mechanism in such manner as to cause the motion of the ground-wheels to be imparted to the seed-delivering mechanism, which will operate for a predetermined period, generally long enough to discharge the kernels for a complete hill, whereupon the clutch will be automatically disengaged, and the delivery of seed will cease.

My invention consists of various improvements in mechanism of this general type, the improvements having in view simplicity and durability of construction and positiveness and certainty in action.

In my improved mechanism the throw of the check-fork imparts directly to the seed-shaft a preliminary or initiatory rocking action, which rocking action has no effect on the seed-delivering mechanism, but which throws the clutch into action, with the result that the seed-shaft being then connected with the ground-wheels receives motion therefrom and actuates the seed-delivering mechanism.

Further, in my improved mechanism the seed-plate is formed at intervals with sets of seed-cells, there being three cells in each set, which sets are separated by a blank or continuous surface, and while the seed-shaft is making a complete revolution but one of the sets of cells and its adjoining blank space is passed over the opening in the runner-shank, so that at each period of action of the seed-shaft three kernels are discharged into the runner-shank.

Further, in my improved construction the second drop or valve in the runner-shank is operated directly from the seed-shaft and by the motion imparted thereto from the ground-wheels, the operation of the valve serving to release the kernels accumulated in the lower end of the shank by the preceding action of the seed-delivering mechanism, the valve being opened while the blank space separating the sets of cells is passing over the opening in the shank and the valve being closed while the cells are passing over said opening, so that there will be no liability of the individual kernels passing directly through the shank and into the ground; but their accumulation in numbers to form a complete hill is insured and their simultaneous discharge from the lower end of the shank directly into the ground rendered certain.

In the accompanying drawings, Figure 1 is a top plan view of a corn-planting machine having my invention embodied therein. Fig. 2 is a transverse vertical sectional elevation taken axially through the seed-shaft at one side of the machine on the line $a\,a$ of Fig. 1. Fig. 3 is a longitudinal sectional elevation on the line $b\,b$ of Fig. 2 as viewed in the direction of the arrow and showing the form of the pinion for imparting motion from the seed-shaft to the seed-delivering mechanism. Fig. 4 is a side elevation of the runner-frame, showing the arrangement of the check-fork and the mechanism by which the seed-shaft is rocked to throw the clutch in action. Fig. 5 is a top plan view, on an enlarged scale, of the clutch mechanism, the parts of the clutch being disconnected. Fig. 6 is a similar view showing the clutch engaged. Fig. 7 is a longitudinal section on the line $c\,c$ of Figs. 1, 2, 5, and 6. Fig. 8 is a view of the outer face of the sliding clutch member. Fig. 9 is a longitudinal sectional elevation on the line $d\,d$ of Fig. 1, showing the means for operating the second drop or valve of the runner-shank. Fig. 10 is a plan view of the seed-ring showing the cells arranged in sets, and Fig. 11 is a perspective view of the hub of the driven clutch member and the fixed collar 29, showing the form and construction of the interlocking fingers and slots on said parts.

Referring to the drawings, 1 represents a rear wheeled frame sustained on an axle 2, on which are mounted covering or ground wheels 3, and 4 represents a front runner-frame jointed as usual to the wheeled frame and carrying seed-hoppers 5, provided in their bottoms with seed-delivering mechanism discharging in the upper ends of runner-shanks 6, by which the seed are directed into the ground. The runner-frame comprises a front transverse frame-bar 7 and a rear parallel frame-bar 8, connected fixedly together at their ends by check heads or brackets 9 and connected together between their ends by the runner-shanks 6, which have their upper ends bolted to said frame-bars.

10 represents the seed or operating shaft extending transversely across the runner-frame between the frame-bars and mounted at its ends in bearings in the check heads or castings. This shaft extends as usual centrally beneath the seed-hoppers, and adjacent the same it has fixed to it, one for each hopper, a vertical bevel-pinion 11, meshing with a gear-ring 12, carrying a seed-ring 13, containing in its periphery groups of seed-cells 14, 15, and 16, one for each kernel and arranged in sets of three, separated by an intermediate blank space 17, for the purpose presently to be described, the rotation of the seed-ring by the gear-ring under the influence of the bevel-pinion acting to carry the seed-cells successively over the upper end of the runner-shank and discharging the kernels therein. The seed-shaft is adapted to have motion imparted to it to thus operate the seed-delivering mechanism through suitable connections from the ground or covering wheels, which connections comprise a sprocket-wheel 19 on the axle 2, around which wheel is passed a sprocket-chain 20, which also passes around a sprocket-wheel 21, mounted loosely on the seed-shaft and receiving a constant rotation from the ground-wheels. The hub of this sprocket-wheel is provided with a radially-extending arm 22, having on its end a driving-tooth 23, extending longitudinally of the seed-shaft, the wheel and arm and tooth thus constituting the driving member of a clutch mechanism. Mounted on the shaft adjacent this sprocket-wheel is the driven member 24 of the clutch mechanism, which is so sustained by the shaft that, while capable of a sliding movement longitudinally thereof to and from the driving member of the clutch, it is compelled to rotate with the shaft. The driven clutch member 24 is in the form of a wheel or disk having on one face (that adjacent the driving member) a series of teeth 25, between which the driving-tooth 23 of the driving clutch member is adapted to engage when the clutch member 24 is moved up to the other clutch member and by means of which engagement the motion of the driving clutch member will be imparted to the seed-shaft. On its opposite side the driven clutch member 24 is formed with a hub 26, from the end of which extends at diametrically opposite sides two longitudinal fingers 27, inclined oppositely and adapted to slidingly fit in corresponding slots 28, formed at diametrically opposite sides in a collar 29, surrounding and firmly fixed to the seed-shaft, the arrangement being such that while this interlocking arrangement of the hub of the clutch member 24 and collar 29 will permit the clutch member to slide along the shaft it will compel the member to rotate with the shaft, so that when the clutch member is engaged with the constantly-rotating driving clutch member the motion imparted to the driven member will through the medium of the fixed collar 29 be transmitted to the seed-shaft. The interlocking connection described also affords a means for imparting motion to the driven clutch member from the seed-shaft, which action is utilized to throw the clutch members into action by a rocking or initiatory movement given the seed-shaft from the check-fork. In order to effect this result, the face of the driven clutch member 24 opposite that on which the series of teeth are formed is provided with two concentrically-arranged circular tracks 30 and 31, (see Fig. 8,) the former lying inside the latter. Track 30 is formed with a depression or socket 30$^a$, and track 31 is formed similarly with a depression or socket 31$^a$, which sockets are arranged at diametrically opposite points on the wheel and are adapted to receive, respectively, oppositely-arranged rollers 33 and 34, carried on the ends of overhanging arms 35 and 36, (see Fig. 2,) extending outward in opposite directions from a bracket or casting 37, secured to the frame-bars of the runner-frame and formed with an opening 38, in which the interlocking portions of the hub 26 and collar 29 have a bearing.

The relation of the parts described is such that when the rollers are seated in the sockets in the tracks the driving-tooth 23 of the driving clutch member will be disengaged from the teeth of the driven clutch member 24, as shown in Fig. 5; but when the rollers are out of the sockets and bearing on the tracks the said driving-tooth 23 will be engaged with the teeth on the clutch member 24, as shown in Fig. 6. Clutch member 24 is acted on by a spiral spring 40, encircling the seed-shaft between a pin or stop 40$^a$ on the seed-shaft and said member 24, which spring tends to force clutch member 24 away from the other clutch member, and when the sockets in the tracks arrive opposite the relatively fixed rollers clutch member 24 will be moved by spring 40, causing the sockets to be promptly seated around the rollers, and thus automatically disconnecting the clutch members. The opposite sliding movement of clutch member 24 toward the other clutch member to connect said clutch members is effected by a slight rocking motion of the seed-shaft, which rocking motion being imparted to member 24 by collar 29 will return clutch member 24 relatively to rollers 33 and 34, thereby carrying the sockets from around the rollers, which will ride up on the tracks and will force the clutch members along the shaft against the resistance of spring 40 and into engagement with the driving-tooth 23 of the driving clutch member. When thus engaged, driving-tooth 23 of the driving clutch member will rotate member 24, and with it the seed-shaft, the two rollers traveling on their respective tracks, and this action will continue until the sockets in the tracks arrive opposite the rollers, whereupon spring 40, acting on clutch member 24 will urge the same along the shaft out of engagement with the driving-tooth of the other clutch member, and the rollers will be seated in the sockets.

By the provision of the two concentric tracks, each with its socket, the seed-shaft is enabled to make a complete revolution before its motion is arrested, and the rollers bearing on the two tracks will cause the clutch member to travel evenly and will prevent the parts from binding or applying an unequal pressure to the seed-shaft, which would result if but one roller and track were employed.

The rocking motion of the seed-shaft to throw the clutch in action is effected by the rearward throw of check-fork 41 (see Fig. 4) when a knot is encountered. The check-fork is connected at its lower end to a horizontal stud 42, mounted in bearings at the outer side of the check head or bracket, and the fork is provided at its lower end with a horizontal rearwardly-extending arm 43, adapted when the check-fork moves rearward in encountering a knot on the wire to engage a finger 44, extending horizontally forward from the end of the seed-shaft, the engagement of the arm with the finger serving to depress the latter, and thereby rock the shaft. The relation of arm 43 to finger 44 and the parts operated thereby is such that the seed-shaft will be positively rocked by the check-fork far enough to cause the clutch members to be fully engaged, whereupon the ground-wheels will take up the motion of the seed-shaft and continue said motion so as to operate the seed-delivering mechanism. In order that when the check-fork rocks the shaft thus the fork will not have imposed on it the work of turning the seed-ring, but will perform the function only of connecting the clutch, I so arrange the driving connection between the seed-shaft and seed-ring that the latter will be entirely unaffected by the rocking motion of the shaft, and the seed-delivering mechanism will not begin to operate until the clutch members have been connected. This reduces the work of the check-fork to a minimum, its only and sole function being to impart a slight rocking motion to the shaft in order to connect the clutch members. The arrangement of the driving connection for this purpose is illustrated in Fig. 3, where it will be seen that the bevel-pinion 11 is mutilated at 11$^a$, in the present instance by the omission of one of its teeth, thus leaving a blank space, so that the bevel-pinion may be turned a limited distance before the teeth of the same come into engagement with the teeth of the gear-ring. In Fig. 3 the parts are in the position they occupy at the moment when the clutch is disconnected and the seed-shaft has come to rest. Here it will be seen that before the bevel-pinion can engage the gear-ring it must move some distance free until its tooth 11$^b$ encounters tooth 13$^a$ of the gear-ring. It is this free movement of the pinion up to its engaging point that is effected by the action of the check-fork and which movement serves to slide clutch member 24 into engagement with the driving-tooth 23 of the other clutch member without moving the seed-delivering mechanism, and by the time the parts of the clutch mechanism are engaged tooth 11$^b$ will have reached tooth 13$^a$, and the seed-ring will then be moved promptly and under the influence of the ground-wheels.

In connection with the mutilated bevel-pinion as described I propose to form in the gear-ring 13 mutilated portions 13$^b$ at four points in its circumference corresponding to the sets of cells in the seed-ring, two teeth of the gear-ring being omitted at these points, leaving four blank spaces, as shown. As a result of this construction, when the gear-ring comes to rest at the completion of each revolution on the seed-shaft it will have moved the seed-ring a quarter-turn, and the parts will be left in such position that tooth 11$^b$ on the bevel-pinion will be free to move in space 13$^b$ to its engaging position without imparting motion to the ring.

As shown in Fig. 9 the second drop or runner shank valve is in the form of a plate 50, pivoted at its upper end, as at 50$^a$, within the shank near its upper end and extending downward therein, with its lower end extending forwardly, as at 50$^b$, and adapted to contact with the forward wall of the shank and close the lower end of the same, the valve when in this position receiving and holding the kernels discharged into the upper end of the shank by the seed-delivering mechanism. The valve is adapted to be moved rearward on its pivot to discharge its kernels by means of a cam 51, fixed to the seed-shaft, in position to engage a roller 52, journaled on the end of an arm 53, extending upwardly and forwardly from the upper end of plate 50. The relation of the cam to the valve and to the mechanism operated by the seed-shaft is such that the cam will not engage the roller-arm until the seed-shaft has been rocked far enough to connect the clutch members, with the result that the valve will be operated by the movement of the shaft under the influence of the ground-wheels, the initiatory rocking action of the shaft having thus no effect on the valve.

The opening movement of the valve takes place during the first part of the movement of the seed-ring, and while the blank portion 17 of said ring is passing over the opening in the runner-shank, so that the previously-accumulated charge of kernels held by the valve in the lower end of the shank is dropped into the ground before the seed-delivering mechanism discharges another charge into the upper end of the shank. When the valve is closed after the cam disengages the roller-arm, the seed-cells pass over the opening in the shank and the seed discharged thereby fall downwardly through the shank and are received by the closed valve ready to be discharged into the ground by the next action of the cam.

Referring to Figs. 5, 6, and 11, it will be seen that the inclination of the interlocking surfaces of the hub of clutch member 24 and fixed collar 29 is such that these surfaces operate with a wedging action—in the one case, when the seed-shaft is preliminarily rocked, to force the clutch member 24 outward along the shaft toward the other clutch member, and in the other case, when the driven clutch member is receiving motion and imparting it to the shaft through the medium of collar 29, to draw the said member back away from the driving member when the sockets in the tracks arrive opposite the rollers. When the seed-shaft is rocked by the check-fork to connect the clutch members, inclined surfaces $28^a$ of the slots in collar 29 act on inclined surfaces $27^a$ of fingers 27 and tend to force clutch member 24 along the shaft to the position shown in Fig. 6, which action greatly facilitates the unseating of the rollers from sockets in the tracks and the engagement of the clutch members. When, however, the driven clutch member 24 is receiving motion from the driving clutch member, inclined surfaces $27^b$ of the fingers 27 act against inclined surfaces $28^b$ of the slots, and the tendency is to move clutch member 24 back again; but this movement of course is not permitted until the sockets arrive opposite the rollers, whereupon by the aid of the wedging action of the inclined surfaces the clutch members are quickly disengaged and the motion of the shaft ceases. It may sometimes happen that when clutch member 24 is moved along the shaft to engage driving-tooth 23 one of the teeth on member 24 will contact with the end of the driving-tooth and the parts will fail at once to effect a driving engagement. In the event of this action the continued movement of member 24 will subject sprocket-wheel 21 to undue pressure and may result in breakage of or injury to the parts. To avoid this liability, I propose to sustain the sprocket-wheel 21 yieldingly, so that it may give under these conditions. This is conveniently effected by applying behind the wheel a spiral spring $21^a$, encircling the seed-shaft and bearing at one end against a pin $21^b$, extended through the shaft, and at its opposite end against the wheel. The tension of the spring is such as to hold the wheel up to its work when it is transmitting power from the ground-wheels to the driven clutch member, but not such as to prevent the wheel from yielding when subjected to undue pressure, such as would result in case the end of driving-tooth 23 engaged with the end of the tooth on the driven member.

Having thus described my invention, what I claim is—

1. In combination with seed-delivering mechanism, a seed-shaft for operating the same, said shaft adapted to be rocked, connections between the seed-shaft and ground-wheels for rotating said shaft, a clutch mechanism included in said connections and adapted to be engaged by the rocking motion of the shaft, a check-row mechanism, and connections between the check-row mechanism and seed-shaft, independent of the clutch mechanism, for rocking the shaft to connect the clutch.

2. In combination with seed-delivering mechanism, a seed-shaft for operating the same, said shaft adapted to be rocked to a limited extent without operating the seed-delivering mechanism, connections between the seed-shaft and ground-wheels for operating the shaft to actuate the seed-delivering mechanism, a clutch mechanism included in said connections and adapted to be engaged by the rocking motion of the shaft, and means for rocking the shaft to connect the clutch mechanism.

3. In combination with the seed-shaft, a check-row mechanism, operative connections between the two for rocking the seed-shaft, a driven clutch member rotatable with and slidable on the seed-shaft and adapted, when the shaft is rocked, to be slid thereon, a driving clutch member loose on the shaft, means for operating the same from the ground-wheels, a seed-delivering mechanism, and connections between the same and the seed-shaft formed to permit the shaft to be rocked without affecting the delivering mechanism.

4. In combination with the seed-shaft adapted to be rocked, a check-row mechanism operating to rock the shaft, a clutch member rotatable with and movable along the seed-shaft, means controlled by the rocking motion of the shaft for moving said clutch member along the same, a second clutch member loose on the shaft, means for driving the same from the ground-wheels, a seed-delivering mechanism, and suitable connections between the same and the seed-shaft.

5. In combination with seed-delivering mechanism, a seed-shaft adapted to operate the same, connections between the ground-wheels and the shaft including a clutch mechanism, means for connecting the clutch mechanism by a rocking motion of the shaft, a check-fork, an arm thereon, and an arm on the seed-shaft adapted to be engaged by the check-fork arm when the check-fork is rocked, and acting when so engaged to rock the seed-shaft.

6. In combination with seed-delivering mechanism, a seed-shaft operatively connected therewith, a sleeve fixed on said shaft, a driven clutch member having a sliding engagement with said sleeve and rotatable with it, a driving clutch member mounted loosely on the seed-shaft and adapted when engaged with the driven member, to impart motion to the same, means for imparting a constant rotation to the driving clutch member, means for rocking the shaft, and means controlled by the rocking motion of the shaft, for sliding the driven clutch member relatively to the sleeve and into engagement with the driving member.

7. In combination with seed-delivering mechanism, a seed-shaft operatively connected therewith, a check-row mechanism including a check-fork, means controlled by the throw of the fork for rocking the shaft, a sleeve fixed to said shaft, and formed with a longitudinal slot, a driven clutch member slidable on the shaft and provided with a finger engaging loosely in said slot, means controlled by the rocking motion of the shaft for sliding the clutch member along the same while engaged with the sleeve, a driving clutch member loose on the shaft, and means for imparting motion to said member from the ground-wheels.

8. In combination with seed-delivering mechanism, a seed-shaft operatively connected therewith, means for rocking the seed-shaft, a driven clutch member slidable on and movable with the shaft, said clutch member comprising a wheel provided on its face with teeth, a driving clutch member consisting of a sprocket-wheel loose on the shaft and formed with a driving-tooth adapted to engage between the teeth on the other member, means for driving said sprocket-wheel from the ground-wheels, and means controlled by the rocking motion of the seed-shaft for moving the driven clutch member along the shaft and into engagement with the driving member.

9. In combination with seed-delivering mechanism, a seed-shaft operatively connected therewith, means for rocking said shaft, a sleeve fixed to the shaft and formed with inclined slots, a clutch member slidable on the shaft and provided with inclined fingers engaging in the slots, a second clutch member loose on the shaft, means for driving the second clutch member from the ground-wheels, and means, controlled by the rocking motion of the shaft, for sliding the first-mentioned clutch member along the same.

10. In combination with a seed-delivering mechanism, a seed-shaft operatively connected therewith, a driven clutch member rotatable with and slidable on the shaft, and provided in its face with sockets or depressions arranged at different distances from the axis of rotation of the member, relatively fixed devices adapted to be seated in said depressions, a driving clutch member loose on the shaft, means for imparting motion to the driving member, and means for rocking the shaft to move the driven member relatively to the fixed devices; whereby said driven member will be moved along the shaft and into engagement with the driving member.

11. In combination with seed-delivering mechanism, a seed-shaft operatively connected therewith, a driven clutch member rotatable with and slidable on the shaft, and provided on its face with concentric tracks having each a depression or socket, disposed at diametrically opposite points, relatively fixed rollers adapted to be seated in said sockets, a driving clutch member loose on the shaft, means for driving the same, and means for rocking the shaft to move the driven member relatively to the rollers and unseat the latter.

12. In combination with seed-delivering mechanism, a seed-shaft operatively connected therewith, a driving clutch member mounted loosely on the shaft and yieldable longitudinally thereon, means for imparting motion to said clutch member, a driven clutch member slidable on the shaft, and means for sliding said driven member into engagement with the driving member.

13. In combination with seed-delivering mechanism, a seed-shaft operatively connected therewith, a driving clutch member comprising a sprocket-wheel mounted loosely on the shaft, a driving-tooth carried by the wheel, a spring encircling the shaft and bearing against said wheel, a stop on the shaft against which the wheel bears under the influence of the spring, means for imparting motion to said wheel, a driven clutch member movable along the shaft to and from the other member, and formed with teeth between which the driving-tooth is adapted to be engaged, and means for moving said driven member to and from the driving member.

14. In combination with seed-delivering mechanism, a seed-shaft, driving connections between the shaft and delivering mechanism for operating the latter when the shaft is rotated, said driving connections being constructed to permit the shaft to be rocked to a limited extent without operating the delivering mechanism, means for rocking the shaft, and means controlled by its rocking motion for initiating the rotary motion of the shaft, 15. In combination with seed-delivering mechanism including a gear-ring, a seed-shaft, a pinion fixed to the seed-shaft and formed with a mutilated portion and adapted to mesh with the gear-ring, and means for rotating the shaft.

16. In combination with seed-delivering mechanism including a horizontal driving gear-ring, a seed-shaft, means for driving said shaft, a vertically-arranged bevel-pinion fixed to the shaft and adapted to mesh with the gear-ring, said pinion being formed with a mutilated or plain surface; whereby the pinion may be turned to a limited extent without imparting motion to the gear-ring.

17. In combination with seed-delivering mechanism, including a gear ring or plate, a seed-shaft, a pinion fixed to said shaft and formed with a mutilated portion adapted to permit the shaft to be rocked without operating the gear-ring, driving connections between the ground-wheels and seed-shaft, said connections including a clutch mechanism, means for rocking the shaft, and means controlled by said rocking motion to engage the clutch mechanism.

18. In combination with a seed-hopper, a seed-plate formed with seed-cells arranged in sets separated by a continuous surface, a seed tube or shank into which said plate discharges, and means for driving the plate.

19. In combination with a seed-hopper, a seed-plate formed with seed-cells arranged in sets separated by a continuous or blank surface, a seed tube or shank having a receiving-opening into which the seed are discharged by the plate, means for moving a blank surface and one set of cells over said opening, and means for arresting the motion of the plate after said cells have passed the opening.

20. In combination with a seed-hopper, a seed-plate formed with seed-cells arranged in sets separated by a blank surface, a seed tube or shank provided with a receiving-opening, a valve in said tube, means for operating the seed-plate to periodically pass a blank portion and set of cells over the receiving-opening, and means for opening the valve in the shank while the blank space is passing over the receiving-opening.

21. In combination with a seed-hopper, a seed-plate formed with seed-cells arranged in sets separated by a blank surface, a seed-tube having a receiving-opening, a valve in said tube, means for operating the seed-plate to periodically pass a blank surface and a set of cells over the receiving-opening, means for opening the valve in the shank while the blank space is passing over the receiving-opening, and means for closing said valve while the cells are passing over said opening.

22. In combination with a seed-hopper, a seed-plate formed with seed-cells arranged in sets, a seed-tube having a receiving-opening, a gear-ring carrying the seed-plate and mutilated at points corresponding to the sets of cells, a seed-shaft, a bevel-pinion fixed to the shaft and formed relatively to the gear-ring to cause a single set of cells to pass over the receiving-opening in the tube during each revolution of the shaft, said pinion being formed with a mutilated portion coöperating with that on the gear-ring, and means for driving the shaft.

23. In combination with a seed-hopper, a seed-plate formed with cells arranged in sets separated by a blank surface, a seed tube or shank provided with a receiving-opening for the seed discharged by the cells, a gear-ring carrying said plate and formed with mutilated portions corresponding to the sets of cells, a seed-shaft, a bevel-pinion thereon formed with a mutilated portion adapted to coöperate with those on the gear-ring to permit the shaft to be rocked without engaging the ring, said parts being formed relatively to cause the seed-plate to make a partial turn for each complete revolution of the shaft, a driving connection between the ground-wheels and shaft, a clutch mechanism included in said connection and adapted to be thrown in gear by the rocking motion of the shaft, and means for rocking the shaft to connect the gear.

24. In combination with seed-delivering mechanism, a seed tube or shank, a valve therein, a seed-shaft operatively connected with the delivering mechanism, means for rotating said shaft periodically to discharge a charge of seed into the shank, and an arm on the seed-shaft in position to engage the valve and operate the same once at every revolution of the shaft.

25. In combination with seed-delivering mechanism, a seed-shaft operatively connected therewith and adapted to be rocked without operating the delivering mechanism, a seed-tube, a valve therein, connections from the ground-wheels to the seed-shaft including a clutch mechanism, means controlled by the rocking motion of the shaft for connecting the clutch mechanism, means for rocking the shaft, and an arm on the shaft adapted when the latter is operated from the ground-wheels, to open the valve, said arm and valve being formed relatively to permit a limited motion of the shaft before the valve is operated.

26. As a new article of manufacture, a seed-ring for seed-planters formed in its peripheral edge with groups of seed-cells separated by a blank surface.

In testimony whereof I hereunto set my hand this 2d day of January, 1906, in the presence of two attesting witnesses.

ALEXUS C. LINDGREN.

Witnesses:
D. L. GARRISON,
P. M. PRICE.